(12) United States Patent
Dashinicha et al.

(10) Patent No.: US 11,508,207 B2
(45) Date of Patent: Nov. 22, 2022

(54) METHODS AND SYSTEMS FOR CONTROLLING A GRAPHICAL USER INTERFACE IN A LIVE-CASINO ENVIRONMENT

(71) Applicant: Evolution Malta Limited, Sliema (MT)

(72) Inventors: Madina Dashinicha, Riga (LV); Nikita Romanovskii, Riga (LV)

( * ) Notice: Subject to any disclaimer, the term of this patent is extended or adjusted under 35 U.S.C. 154(b) by 0 days.

(21) Appl. No.: 17/165,543

(22) Filed: Feb. 2, 2021

(65) Prior Publication Data
US 2021/0241564 A1 Aug. 5, 2021

(30) Foreign Application Priority Data
Feb. 4, 2020 (EP) .................................. 20155470

(51) Int. Cl.
*G07F 17/32* (2006.01)
*H04N 7/15* (2006.01)

(52) U.S. Cl.
CPC ........ *G07F 17/322* (2013.01); *G07F 17/3211* (2013.01); *G07F 17/3218* (2013.01); *G07F 17/3239* (2013.01); *G07F 17/3269* (2013.01); *G07F 17/3276* (2013.01); *G07F 17/3293* (2013.01); *H04N 7/152* (2013.01)

(58) Field of Classification Search
USPC .......................................................... 463/42
See application file for complete search history.

(56) References Cited

U.S. PATENT DOCUMENTS

| | | | |
|---|---|---|---|
| 8,286,103 B2 | 10/2012 | Chaudhri | |
| 2011/0079959 A1 | 4/2011 | Hartley | |
| 2012/0309524 A1* | 12/2012 | Rajaraman | G07F 17/3206 463/31 |
| 2013/0196777 A1 | 8/2013 | Hill | |
| 2015/0371498 A1 | 12/2015 | Snow | |
| 2016/0335852 A1 | 11/2016 | Wolff | |
| 2018/0082525 A1* | 3/2018 | Rajaraman | G07F 17/3223 |

(Continued)

FOREIGN PATENT DOCUMENTS

AU 2014202770 B2 1/2015

OTHER PUBLICATIONS

European Patent Office. Extended European Search Report for application 20155470.6 dated Aug. 13, 2020. 8 pages.

*Primary Examiner* — Pierre E Elisca
(74) *Attorney, Agent, or Firm* — Quarles & Brady LLP

(57) ABSTRACT

Methods and systems for controlling a graphical user interface in a live-casino environment are provided. The method comprises, at a plurality of remote electronic devices, each having a display apparatus and at least one user input device: displaying a graphical representation comprising a live video stream of a physical table game surface upon which a turn-based live casino game involving betting is played. The game surface has a plurality of player areas. The graphical representation further comprises a plurality of graphical player elements for each player area. The method includes determining which of the player areas is associated with each remote electronic device, and for each launch of a game cycle of the live casino game, updating the graphical representation on each display apparatus. And digitally zooming in on one predefined area of the game surface based on the determined associated player area for the individual remote electronic device.

20 Claims, 7 Drawing Sheets

(56) References Cited

U.S. PATENT DOCUMENTS

2018/0349703 A1* 12/2018 Rathod .............. G06Q 20/3276
2020/0302746 A1*  9/2020 Cleveland ............... A63F 1/067
2021/0110666 A1*  4/2021 Thomas ............. G07F 17/3276
2021/0243500 A1*  8/2021 Petrov ................ H04N 21/4781

* cited by examiner

METHODS AND SYSTEMS FOR CONTROLLING A GRAPHICAL USER INTERFACE IN A LIVE-CASINO ENVIRONMENT

CROSS REFERENCE TO RELATED APPLICATIONS

This application claims priority to European Patent Application No. EP 20155470.6 filed Feb. 4, 2020, the disclosure of which is incorporated herein by reference in its entirety and for all purposes.

TECHNICAL FIELD

The present disclosure relates to methods, computer program products, and systems for providing and controlling a graphical user interface on a display apparatus of a remote user device.

BACKGROUND ART

A player's objective in blackjack is to beat the dealer (in other words, the house) with cards totaling equal to or less than 21, without going over 21, which is known as "busting." The house has a slight advantage due to the fact that the player must go first and if the player busts, the player automatically loses even if the dealer would have or does subsequently bust.

Before the cards are dealt for each blackjack hand, the player selects the amount he wishes to wager on that hand. The dealer then deals two cards to the player, and two to himself—one face up and one face down. Face cards (kings, queens and jacks) count as 10, aces count as one or 11 (as the player chooses) and all other cards are counted at their face value.

Depending on the pair of cards that are dealt to the dealer and the player, various options are available to the player. If the pair of cards dealt to the player equal 21 (i.e., an ace and a 10 or face card), the player has blackjack and wins the hand unless the dealer also has a blackjack, in which case the hand is a tie, also known as a "push." A winning blackjack pays the player 3 to 2 on his wager. If the pair of cards dealt to the player do not equal 21, the player may hit or stand, or in certain circumstances, the player may take insurance, split a pair, double down, surrender, or take even money.

The player may "hit" if he wants another card, or "stand" if he is satisfied with the total of his hand and does not want another card. The player may typically hit as many times as he wishes before standing, as long as the player's total does not exceed 21. If any hit causes the player's total to exceed 21, the player busts and automatically loses the hand. If the dealer's face-up card is an ace, the player is given an option to make an insurance wager, which is a side bet that the dealer's face-down (hole) card will be a ten-value card (i.e., either a 10 or a face card). The players can make an insurance bet equal to one half of the player's initial bet on the hand. If the dealer's down card is revealed to be a ten-value card, the player wins the insurance bet at 2 to 1 odds. If the dealer's down card is revealed to be any other card, the player loses the insurance bet.

As more and more content, trade, and even social interaction move into the digital arena many new applications are being developed to enhance the user experience. Furthermore, as we move towards digital solutions trust issues will become of increased importance. If you as a user interact with a software solution there can always be a risk that the software is programmed to deliver content and solutions that are biased in view of the expectations and to the benefit of the content provider.

This is for instance a highly relevant issue relating to areas that depends on some kind of random generator; there is often a risk that these type of solutions will be interpreted as being biased towards the service provider's benefit. One such technology area can for instance be seen in the gaming industry, such as online casinos providing randomized games such as roulette, card games, crap games, and so on. For this purpose, parts of the online gaming industry combine digital and real-world experience by filming actual casino games with real people as service providers at the casino game tables and providing the user a possibility to interact with real-life games digitally and remotely, a so called online live casino. Thus, the user will be provided with a gaming experience environment as if he or she were present in the casino and with the same randomness as a live casino experience from home or on a mobile user device.

The same holds true for other areas where the users interact with the digital world, combining digital and live real-world content can provide an enhanced experience and improved user-machine interaction. Furthermore, behavioral studies show that by gamifying tasks, users will be more efficient in performing the tasks since level of satisfaction and acknowledgement increases.

Moreover, with the increased popularity of online live casino games there is an ever growing need in the art to improve various aspects related thereto, such as for example the human-machine interactions. In particular, when a player is playing a Blackjack game in an online live-casino environment, the game is often very fast-paced and it is often difficult for the player to keep track of the game due to inefficient user interfaces. This is particularly relevant for mobile applications where users are playing on handheld devices (e.g. smartphones) where the interface is relatively small which adds to the stress and cognitive burden of the player. Moreover, due to the small size of the interface it has proven to be very difficult for users to for example actually see the physical cards on the video, both because of their small size and because of the number of virtual graphical elements arranged in close proximity to the physical cards. Since it is difficult to properly observe the physical elements (i.e. details in the live video feed) the players more often rely on the virtual cards in the interface which defeats the purpose of playing online live Blackjack.

SUMMARY

It is therefore an object of the present disclosure to provide, which alleviate all or at least some of the above-discussed drawbacks of presently known solutions.

In particular it is an object of the present disclosure to provide an efficient and intuitive user interface for live-casino environments such as live Blackjack games which reduce the cognitive burden imposed on players and improve the overall user experience.

This object is achieved by means of a method, a computer-readable storage medium, a system, and an electronic device as defined in the appended claims. The term exemplary is in the present context to be understood as serving as an instance, example or illustration.

According to a first aspect of the present disclosure, there is provided a method comprising at a plurality of remote electronic devices, each having a display apparatus and at least one user input device: displaying, via the display apparatuses, a graphical user interface comprising a graphical representation. The graphical representation comprises a live video stream of a physical table game surface upon which a turn-based live casino game involving betting is played. The physical table game surface has a plurality of player areas distributed across the table game surface, where each remote electronic device is associated with at least one player area. The graphical representation further comprises a plurality of graphical player elements for each player area, each plurality of graphical player elements being provided on a corresponding player area. The method further comprises determining which of the plurality of player areas is associated with each remote electronic device, and for each launch of a game cycle of the live casino game, updating the graphical representation on each display apparatus. The updating of the graphical representation being performed by for each individual remote electronic device, digitally zooming in on one predefined area of a plurality of predefined areas of the physical table game surface based on the determined associated player area for the individual remote electronic device.

According to another aspect of the present disclosure, there is provided a (non-transitory) computer-readable storage medium storing one or more programs configured to be executed by one or more processors of a processing system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to another aspect of the present disclosure there is provided a system comprising control circuitry configured to at a plurality of remote electronic devices, each having a display apparatus and at least one user input device: display, via the display apparatuses, a graphical user interface comprising a graphical representation. The graphical representation comprises a live video stream of a physical table game surface upon which a turn-based live casino game involving betting is played. The physical table game surface has a plurality of player areas distributed across the table game surface, and each remote electronic device is associated with at least one player area. The graphical representation further comprises a plurality of graphical player elements for each player area, each plurality of graphical player elements being provided on a corresponding player area. The control circuitry is further configured to determine which of the plurality of player areas is associated with each remote electronic device, and for each launch of a game cycle of the live casino game, update the graphical representation on each display apparatus. The update of the graphical representation being performed by for each individual remote electronic device, digitally zooming in on one predefined area of a plurality of predefined areas of the physical table game surface based on the determined associated player area for the individual remote electronic device. With this aspect of the disclosure, similar advantages and preferred features are present as in the previously discussed aspects of the disclosure.

According to another aspect of the present disclosure there is provided a system comprising a physical table game surface upon which a turn-based live casino game involving betting is played, wherein the physical table game surface has a plurality of player areas distributed across the table game surface. The system further comprises a camera configured to record a live video stream of the physical table game surface, a server configured to obtain the live video stream and provide the video stream to a plurality of remote electronic devices, and one remote electronic device comprising one or more processors, at least one memory, a communication interface, a display apparatus, and at least one user input device. The one or more processors of the one remote electronic device are configured to operate instructions stored in the memory for displaying the video stream and detecting user input events from the at least one user input device, and further configured to operate the method according to any one of the embodiments disclosed herein. With this aspect of the disclosure, similar advantages and preferred features are present as in the previously discussed aspects of the disclosure.

According to another aspect of the present disclosure there is provided an electronic device comprising a display apparatus, one or more processors, at least one user input device, a memory storing one or more programs configured to be executed by the one or more processors. The one or more programs include instructions for performing the method according to any one of the embodiments disclosed herein. With this aspect of the disclosure, similar advantages and preferred features are present as in the previously discussed aspects of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
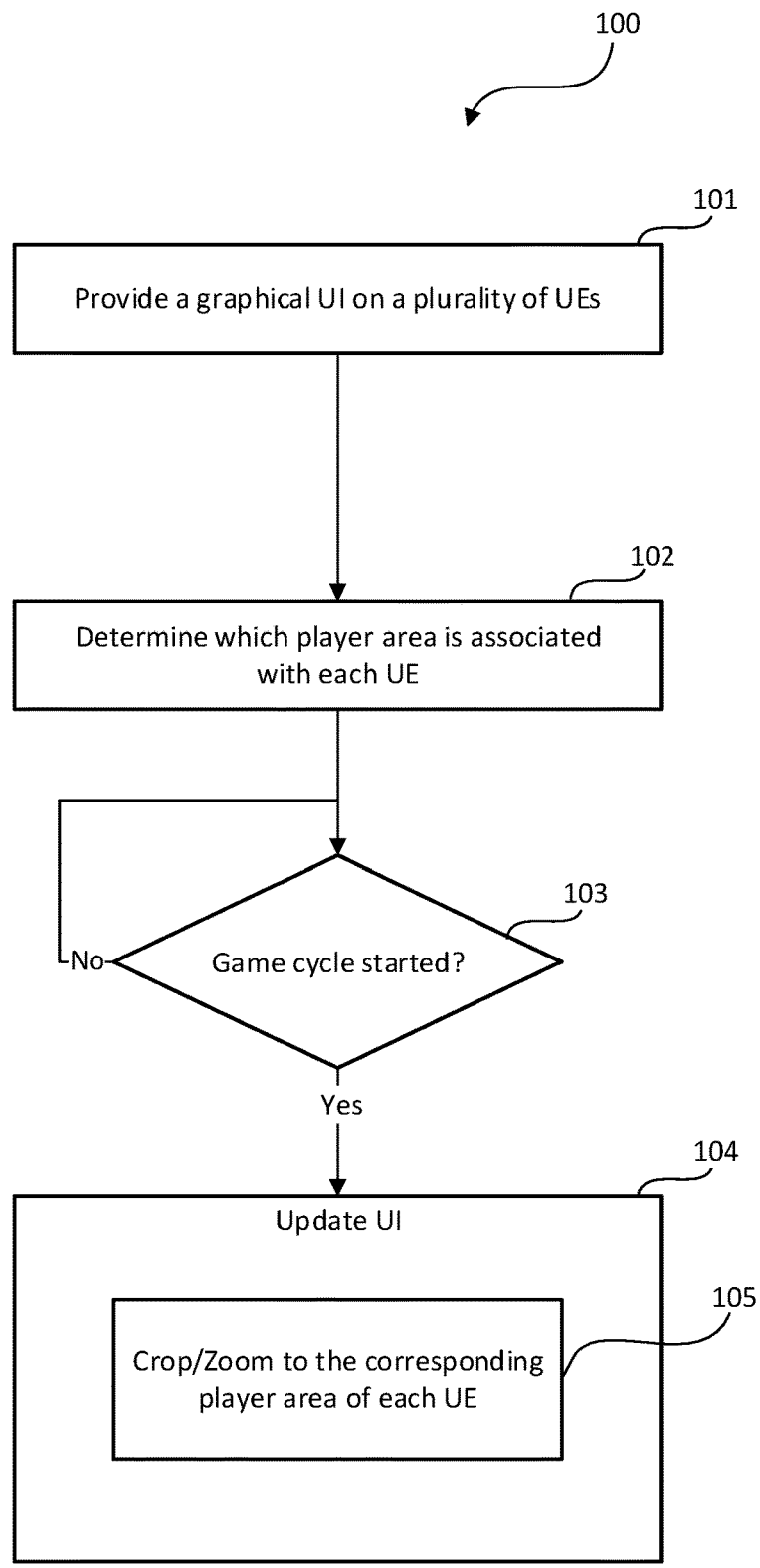
FIG. 1 is a schematic flow chart representation of a method for controlling a graphical user interface in a live-casino environment in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. In some of the illustrated embodiments the same or similar components have not all been provided with reference numerals so to avoid unnecessary cluttering of the drawings. However, such obvious considerations are readily understood and appreciated by the skilled person in the art and should not be construed as limiting to the or in any other way have a negative impact on the present disclosure.

FIG. 1 is a schematic flow chart representation of a method 100 for controlling a graphical user interface in a live-casino environment in accordance with an embodiment of the present disclosure. In particular, the method 100 is suitable for controlling a graphical user interface of an online live Blackjack game on a handheld electronic user device such as a smartphone, tablet, or the like.

The method 100 comprises, providing 101 a graphical user interface on a plurality of remote electronic devices (may also be referred to as User Equipment). Each remote electronic devices accordingly comprises a display apparatus and at least one user input device (e.g. button, knob, touch-sensitive display, or similar). The term "remote" electronic devices may be construed as that the devices are not physically connected to each other. Thus, stated differently, the method 100 comprises at a plurality of remote electronic devices, each having a display apparatus and at least one user input device: displaying 101, via the display apparatuses, a graphical user interface.

The set-up of a touch screen graphical user interface on mobile devices such as smart phones and the like are known from, e.g., U.S. Pat. No. 8,286,103. This patent describes the implementation of a slide to unlock function, on e.g. Apple Corporation's mobile phones, tablets and personal digital assistants. It also illustrates the relevant components of an electronic device including the input-output system. Yet further it describes user interface states in which actions are enabled and disabled.

Moving on, the graphical user interface comprises a graphical representation comprising a live video stream of a physical table game surface upon which a turn-based live casino game involving betting is played, such as e.g. Blackjack. The physical table game surface has a plurality of (imaginary) player areas distributed across the table game surface, and each remote electronic device is associated with at least one player area. The player areas may be understood as the "seat" and the area in front of "the seat" of a player, where each player's cards and chips are placed in a conventional Blackjack game.

The graphical representation further comprises a plurality of graphical player elements for each player area. Each plurality or set of graphical player elements are provided on a corresponding player area. In other words, the graphical representation comprises a set of graphical player elements, i.e. virtual graphical elements that are overlaid on the live video stream/feed of the physical table game surface. The virtual graphical elements may for example comprise icons indicative of one or more of a wager of a player (i.e. one or more chips), an avatar of the player, a screen name of the player, a current total score of the player, and so forth.

Further, the method 100 comprises determining 102 which (i.e. one or more) of the plurality of player areas is/are associated with each remote electronic device. This step 102 may be construed as pairing 102 a player area with a player/account/remote electronic device. Then, for each launch of a game cycle (i.e. for each round of a Blackjack game), the method 100 comprises updating 104 the graphical representation on each display apparatus. More specifically, when it is detected 103 that a new game cycle has stated, the graphical representation is modified for each individual remote electronic device so to digitally zoom 105 in one predefined section/area of a plurality of predefined sections/areas of the physical table game surface based on the determined associated player area for the individual remote electronic device. Digitally zooming should be differentiated from optical zooming, which is done by the physical camera providing the live video stream. Digital zooming or "cropping" allows for enhancing or zooming in on different sections/areas of the physical table game surface for different remote electronic devices. The terms digital zooming and cropping are herein used synonymously, as a digital zoom essentially enlarges a portion of an image or video feed and crops away surrounding portions.

Thus, for a first electronic device having a "seat" on the left end of the table, the user interface is adapted so to zoom in on the left section of the physical table game surface, while for a second electronic device having a "seat" on the right end of the table, the user interface is adapted so to zoom in on the right section of the physical table game surface. Preferably, there are three predefined sections or areas of the physical table game surface (left, middle and right).

In summary, the method allows for each player to have an overview of the physical table game surface before the cards are dealt, which provides a good overview of the number of players, their bets, and so forth. However, as soon as the game starts (the first card is dealt) the live video feed is cropped or zoomed in to the area of the physical table game surface where the player's physical cards will be dealt in order to provide a better view and experience of the game.

The zooming 105 feature prompts the players to pay closer attention to the game as well.

Figure 2:
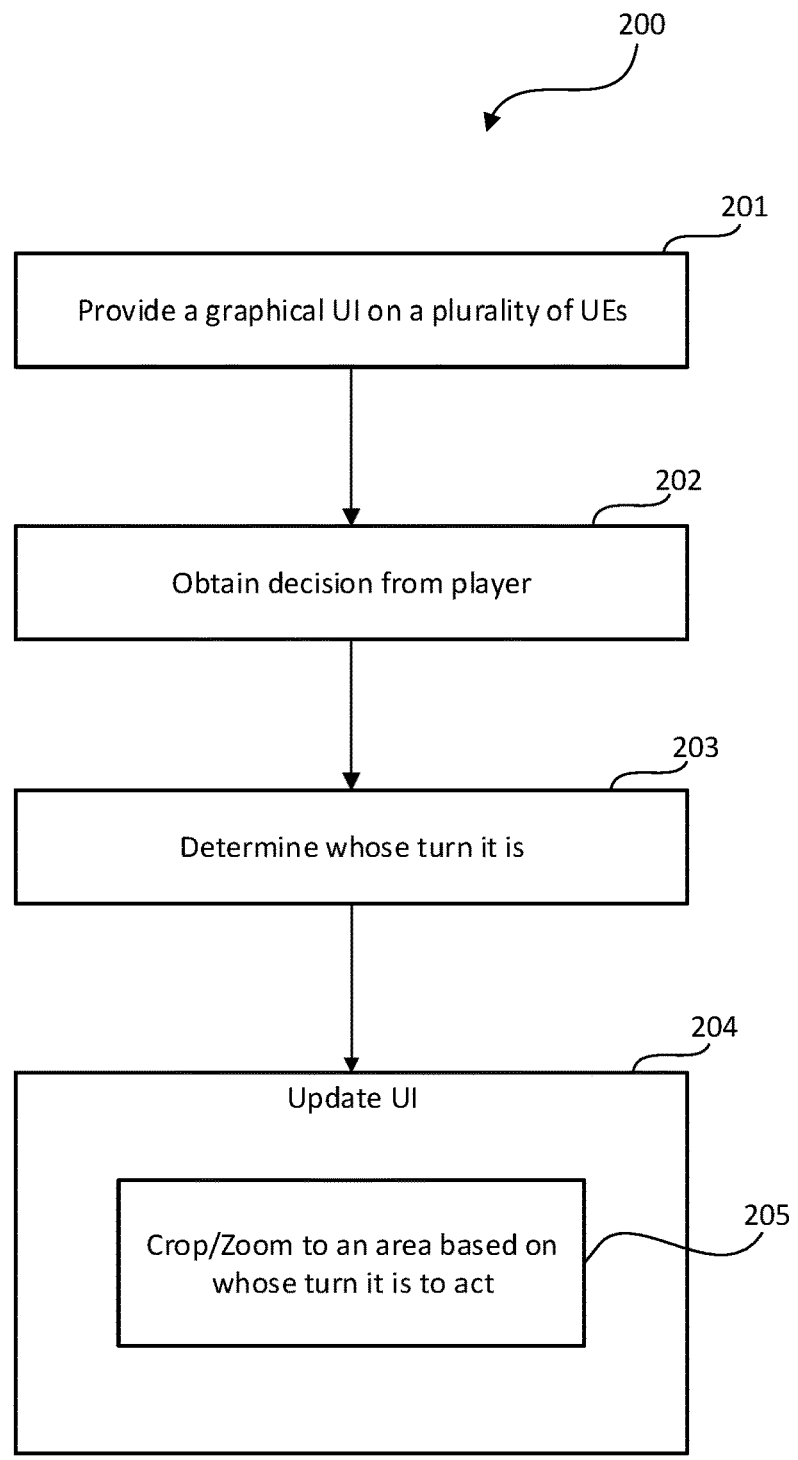
FIG. 2 is a schematic flow chart representation of a method for controlling a graphical user interface in a live-casino environment in accordance with an embodiment of the present disclosure.

However, in some embodiments of the present disclosure, as soon as a decision (e.g. "Hit", "Stand", "Double", "Split") is chosen by the player and the turn is one a different player in the game, the user interface is updated so to "follow" the game, i.e. to zoom in towards the area or section of the physical table game surface where the "active" player is seated. This is further elucidated in FIG. 2 showing a schematic flow chart representation of a method 200 for controlling a graphical user interface in a live-casino environment in accordance with an embodiment of the present disclosure. In particular, the method 200 is suitable for controlling a graphical user interface of an online live Blackjack game on a handheld electronic user device such as a smartphone, tablet, or the like.

The method 200 comprises, providing 201 a graphical user interface on a plurality of remote electronic devices (may also be referred to as User Equipment). Each remote electronic devices accordingly comprises a display apparatus and at least one user input device (e.g. button, knob, touch-sensitive display, or similar). The term "remote" electronic devices may be construed as that the devices are not physically connected to each other. Thus, stated differently, the method 100 comprises at a plurality of remote electronic devices, each having a display apparatus and at least one user input device: displaying 201, via the display apparatuses, a graphical user interface.

Further, the method 200 comprises obtaining 201 a user decision event from the at least one user input device of one remote electronic device (i.e. from one individual remote electronic device of the plurality of remote electronic devices). For example, the step of obtaining 201 a user decision event may for example be determining that a specific icon of a plurality of graphical icons have been interacted with (e.g. touched). The user decision event may for example be a "Stand" decision by the user in a game of Blackjack.

Further, the method 200 comprises, determining 203 an occurrence of a time to act in the turn-based live casino game for each remaining remote electronic device during each game cycle. In other words, the method 200 comprises determining 203 whose turn (of the plurality of remote electronic devices) it is to act in the game, or more simply, just following the game.

After the user decision event (e.g. "Stand" decision) for the one remote electronic device has been obtained 201, the graphical representation of the user interface is updated 204 on the display apparatus of the one remote electronic device, i.e. the remote electronic device that generated the user decision event. More specifically, the graphical representation is updated by digitally zooming in 205 on one of predefined areas of the physical table game surface based on the determined 203 time to act for each of the remote electronic devices so to emphasize the player area associated with each remaining remote electronic device according to their time act. Stated differently, the method 200 goes into a state of "following" the game by moving the zoom (or by cropping the live video feed) based on whose turn it is. This facilitates the tracking of the game for the players and allows the players to observe the relevant actions of the game as they occur, thereby improving the overall user experience.

However, in some cases the user may want to observe a different section of the physical table game surface than the one where the current "turn" is. In those cases a player may override the "automatic" tracking of the game by merely performing a swipe action on the touch sensitive display of the remote electronic device. If the remote electronic device is not provided with a touch sensitive display other gesture control methods may be adopted as known in the art.

Figure 3:
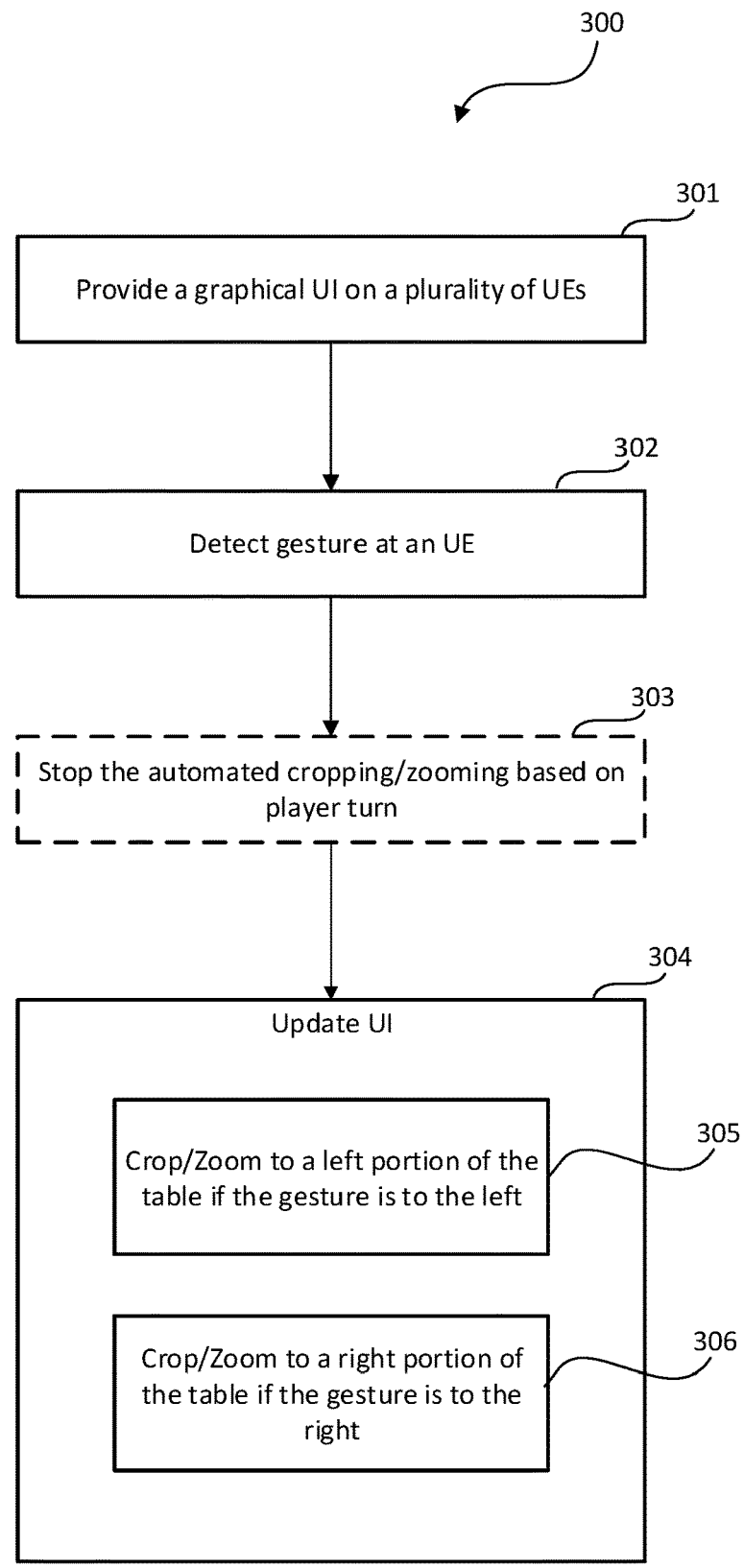
FIG. 3 is a schematic flow chart representation of a method for controlling a graphical user interface in a live-casino environment in accordance with an embodiment of the present disclosure.

Further, FIG. 3 is a schematic flow chart representation of a method 300 for controlling a graphical user interface in a live-casino environment in accordance with an embodiment of the present disclosure. In particular, the method 300 is suitable for controlling a graphical user interface of an online live Blackjack game on a handheld electronic user device such as a smartphone, tablet, or the like.

The method 300 comprises, providing 301 a graphical user interface on a plurality of remote electronic devices (may also be referred to as User Equipment). Each remote electronic devices accordingly comprises a display apparatus and at least one user input device (e.g. button, knob, touch-sensitive display, or similar). The term "remote" electronic devices may be construed as that the devices are not physically connected to each other. Thus, stated differently, the method 100 comprises at a plurality of remote electronic devices, each having a display apparatus and at least one user input device: displaying 301, via the display apparatuses, a graphical user interface.

Further, the method 300 comprises, while the graphical user interface is displayed 301, detecting 302 a gesture, via the at least one input device, of one (specific) remote electronic device, directed to the graphical user interface. Moreover, in response to detecting 302 the gesture the user interface is updated 304. The detected gesture may also override 303 any "automatic" updating of the graphical representation of the user interface, i.e. override 303 the automatic tracking of the game based on whose turn it is.

Accordingly, in response to detecting 302 the gesture and in accordance with a determination that the gesture (e.g. swipe on a touch-sensitive display) is in a first direction, updating 304 the graphical representation on the display apparatus of the one remote electronic device by digitally zooming 305 or cropping 305 in on a first predefined area/section of the plurality of predefined areas/sections. Additionally, in response to detecting 302 the gesture and in accordance with a determination that the gesture (e.g. swipe on a touch-sensitive display) is in a second direction, updating 304 the graphical representation on the display apparatus of the one remote electronic device by digitally zooming 306 or cropping 306 in on a second predefined area/section different from the first predefined area.

The automatic or user-controlled "digital zoom" or "crop" will be further elucidated now in reference to FIGS. 4a-4d which show schematic illustrations of a user interface 20 on an electronic user device implementing a method for controlling a graphical user interface 20 in a live-casino environment in accordance with an embodiment of the present disclosure. In particular, the graphical user interface 20 represents an online live Blackjack game on a handheld electronic user device having a touch sensitive display such as a smartphone, tablet, or the like.

Figure 4A:
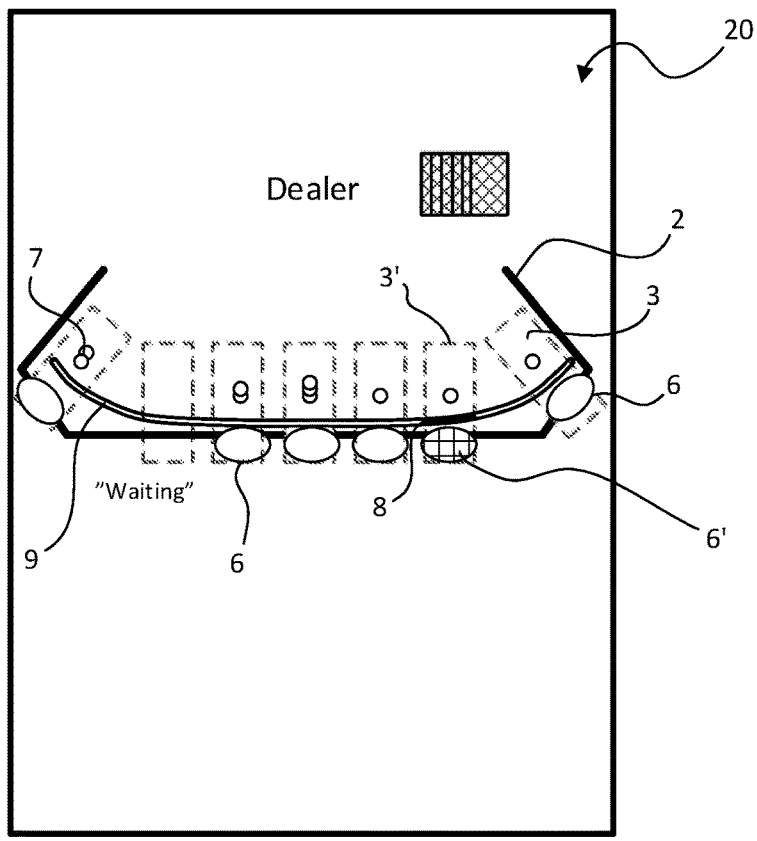
FIGS. 4a-4d are schematic illustrations of a user interface on an electronic user device implementing a method for controlling a graphical user interface in a live-casino environment in accordance with an embodiment of the present disclosure.

Accordingly, FIG. 4a shows a graphical user interface 20 comprising a graphical representation having a live video stream of a physical table game surface 2 upon which a Blackjack game is played. The physical table game surface 2 has a plurality of player areas 3, 3' distributed across the table, each player area 3, 3' being associated being associated with one remote electronic device. The graphical representation further has a plurality of graphical player elements 6, 7 for each player area. Here, each set or plurality of graphical player elements comprise icons 7, 7' or elements 7, 7' indicative of a placed bet, and icons 6' 6' or elements 6, 6' indicative of a user avatar, card score, username or the like. In some embodiments, the current total card score is displayed in the circular element 6, 6' in each player area. Moreover, the illustrations are made in perspective of a remote electronic user device associated with the player area 3' indicated by the patterned icon 6'. Moreover, this player area 3' is further indicated by a highlighted section 8 of a virtual "laser line" 9 overlaid on the live video feed.

Figure 4B:
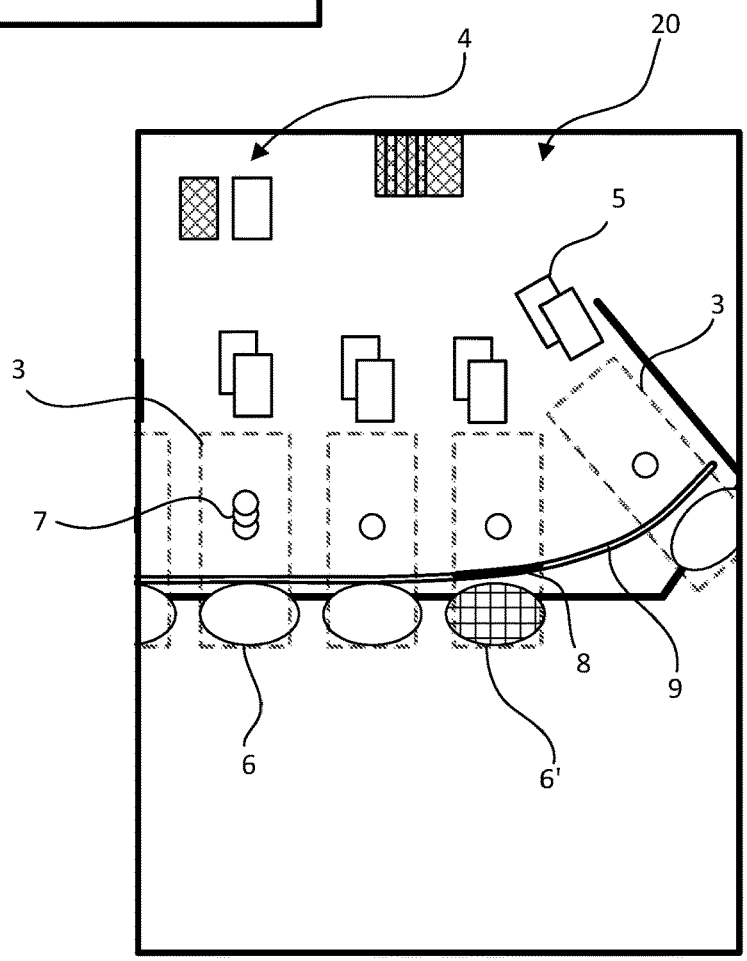

In FIG. 4*a*, the game cycle has not been launched yet, as can be deducted from the lack of dealt cards on the physical table game surface 2. Thus, the user interface 20 provides a "zoomed out" perspective view of the whole table game surface 2. However, at the launch of a game cycle (cards are being/have been dealt) the graphical representation of the user interface 20 is updated, as shown in FIG. 4*b*, and a digital zoom is applied. More specifically, since the player 6' is seated to the right side of the table 2, the live video feed is cropped/zoomed in to a right section of the physical table game surface 2. Thus, the definition of when a game cycle is launched may be either as the first card is dealt or when all of the cards have been dealt and the first action is performed (e.g. pay-out to blackjack winners, or a player is prompted to make a decision).

Further, while the graphical user interface 20 is displayed on the display apparatus of a remote electronic device, a gesture is detected, via the at least one input device, of the remote electronic device, directed to the graphical user interface 20. The detected gesture was a right-swipe on the touch-sensitive display of the remote electronic device.

Figure 4C:
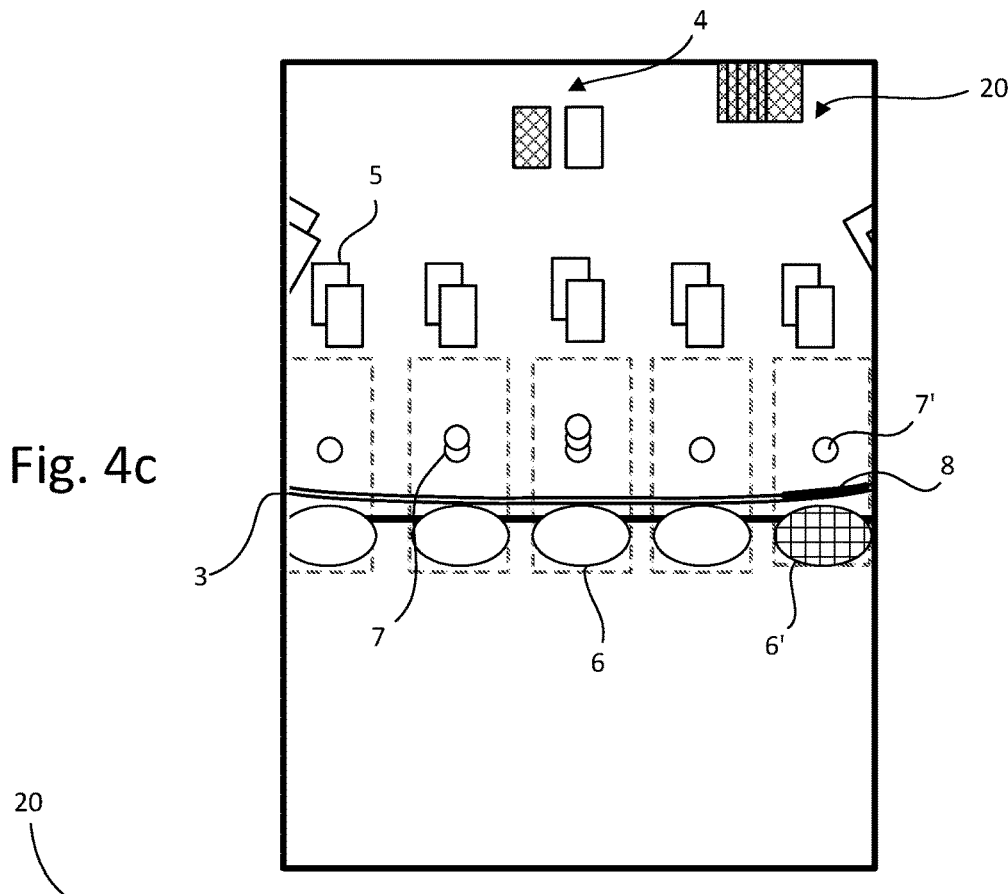

Therefore, in response to detecting the gesture, and in accordance with determining that the gesture is in the right direction, the graphical representation of the user interface 20 is updated on the display apparatus of the remote electronic device by digitally zooming in on a predefined area of the physical table game surface 2. More specifically, the view is moved to a middle/centre portion of the table game surface 2 as illustrated in FIG. 4*c*.

Then, while displaying the graphical user interface on the display apparatus of a remote electronic device, another gesture is detected, via the at least one input device, of the remote electronic device, directed to the graphical user interface 20. The detected gesture was another right-swipe on the touch-sensitive display of the remote electronic device.

Figure 4D:
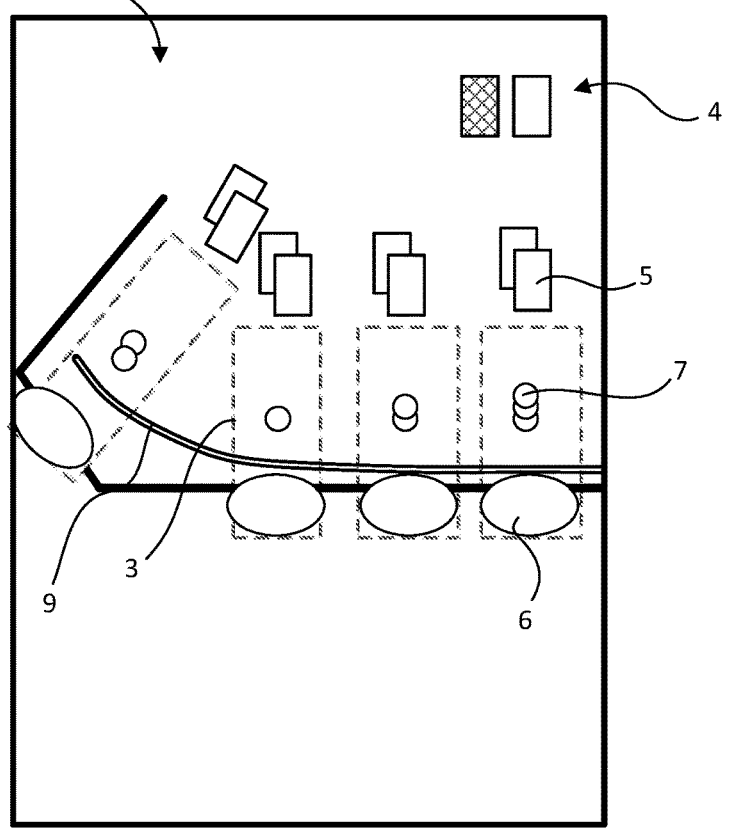

Therefore, in response to detecting the gesture, and in accordance with determining that the gesture is in the right direction, the graphical representation of the user interface 20 is updated on the display apparatus of the remote electronic device by digitally zooming in on a predefined area of the physical table game surface 2. More specifically, the view is moved to a left portion of the table game surface 2 as illustrated in FIG. 4*d*. The transitions between the different predefined areas of the physical table game surface 2 is preferably done continuously and smoothly. Analogously, if it was determined that the gesture was in the left direction, the user interface 20 would be updated on the display apparatus of the remote electronic device by digitally zooming on an area in the opposite direction (e.g. moving from the left section in FIG. 4*d* to the middle section in FIG. 4*c*).

Figure 5A:
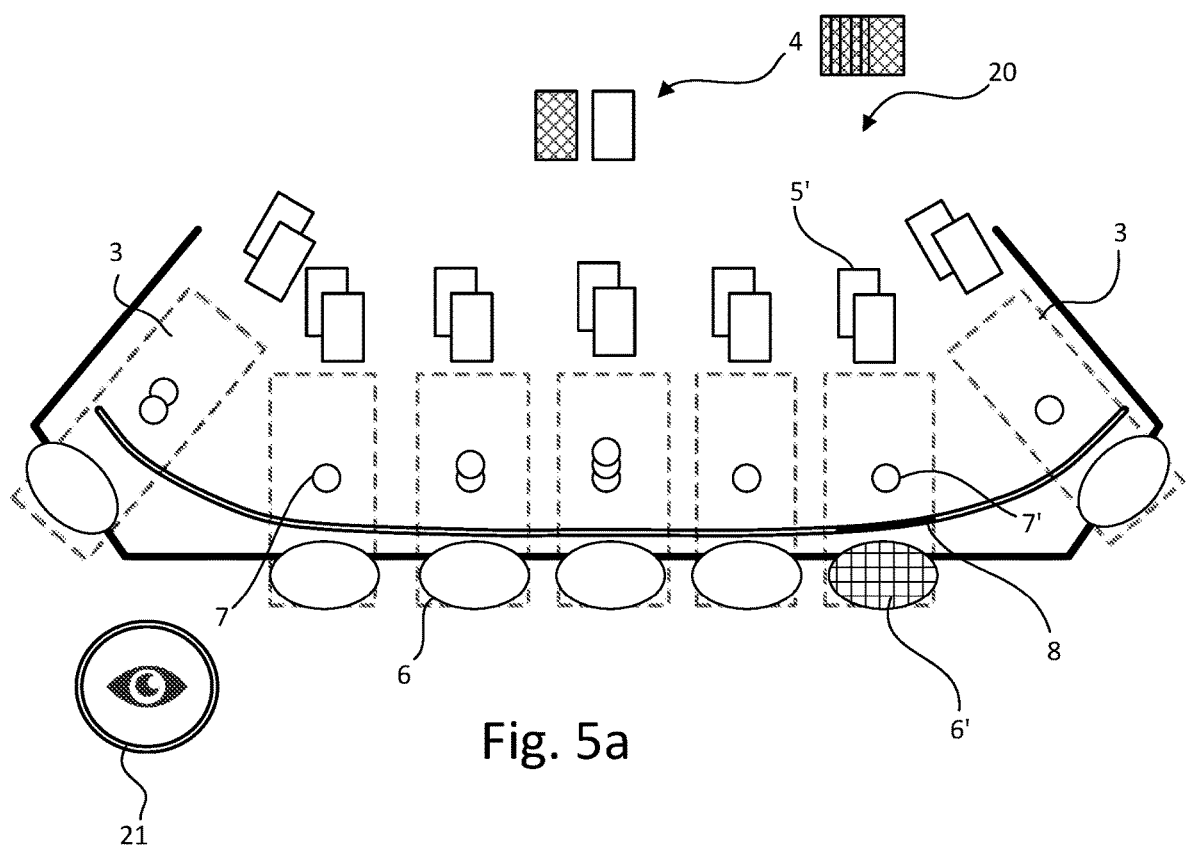
FIGS. 5a-5b are schematic illustrations of a user interface on an electronic user device implementing a method for controlling a graphical user interface in a live-casino environment in accordance with an embodiment of the present disclosure.
Figure 5B:
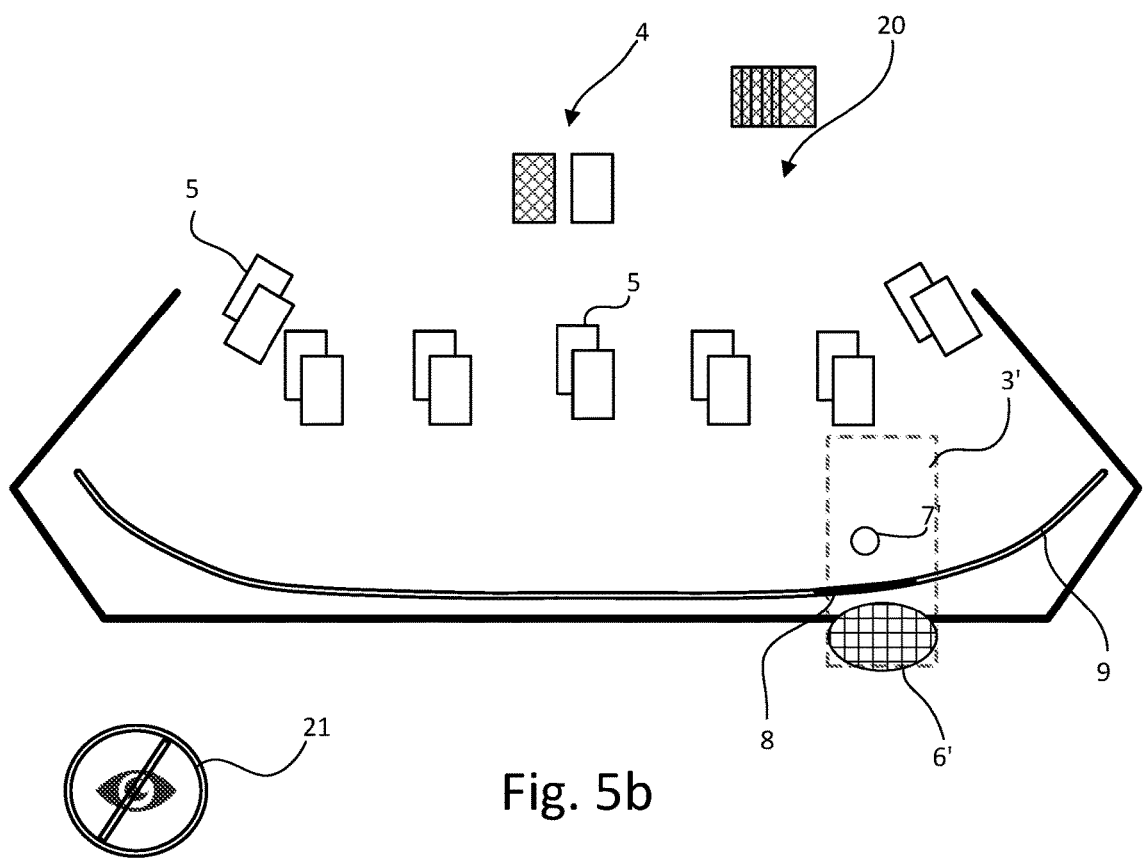

Further, in order to further enhance the user experience of an online live-casino environment such as a live Blackjack game played on a mobile device with a relatively small display, the present inventors realized that the sheer number of various elements may distract the user during critical parts of the game. Thus, in order to mitigate this problem, alleviate at least some of the cognitive burden imposed on the user, and thereby provide a more efficient human-machine interaction, a user-selectable "focus mode" is provided. The user is allowed to freely toggle between this mode and a "classic" mode at any time while the player is seated at the table 2. An example user interface in the "classic" mode is illustrated in FIG. 5*a*, while the "focus" mode is illustrated in FIG. 5*b*. The method implementing the toggling between the focus mode and the classic mode as will be described in the following may be implemented without the features related to the digital zooming discussed in the foregoing.

Accordingly, at a first remote electronic device of the plurality of electronic devices, a graphical user interface 20 is displayed via the displayed apparatus of the first electronic device. As before, the position at the table 2 of the user of the first electronic device is indicated by the patterned icon 6'. The graphical user interface 20 comprises a graphical representation further comprising a plurality of graphical interaction elements with which the user of the first electronic device can interact. The plurality of graphical elements may for example be decision icons (not shown) such as "Stand", "Double", and "Hit", as well as a first graphical interaction element 21. The first graphical interaction element 21 is a mode-toggle element.

Further, while the graphical user interface 20 is displayed, an input directed to the first graphical interaction element 21 is detected via one or more input devices associated with the first remote electronic device. Then, in response to the detected input, the graphical user interface 20 on the display apparatus of the first remote electronic device is updated by removing one or more graphical elements 6, 7 from the player areas not associated with the first remote electronic device. Moreover, the first graphical interaction element 21 is modified so to indicate the currently selected mode. As illustrated in FIG. 5*b* only elements needed for decision during a decision offer (i.e. while it is the user of the first electronic device's turn to act) are displayed. That is, only the dealer's cards 4, all of the player's cards 5, 5', and the user of the first electronic device's card score (may be indicated in the element 6') are displayed, while all other (virtual) graphical elements (i.e. graphical elements not part of the live video feed) are removed. This facilitates the decision making for the player which is advantageous due to the limited time to make decisions in Blackjack games.

Executable instructions for performing these functions are, optionally, included in a non-transitory computer-readable storage medium or other computer program product configured for execution by one or more processors.

Figure 6:
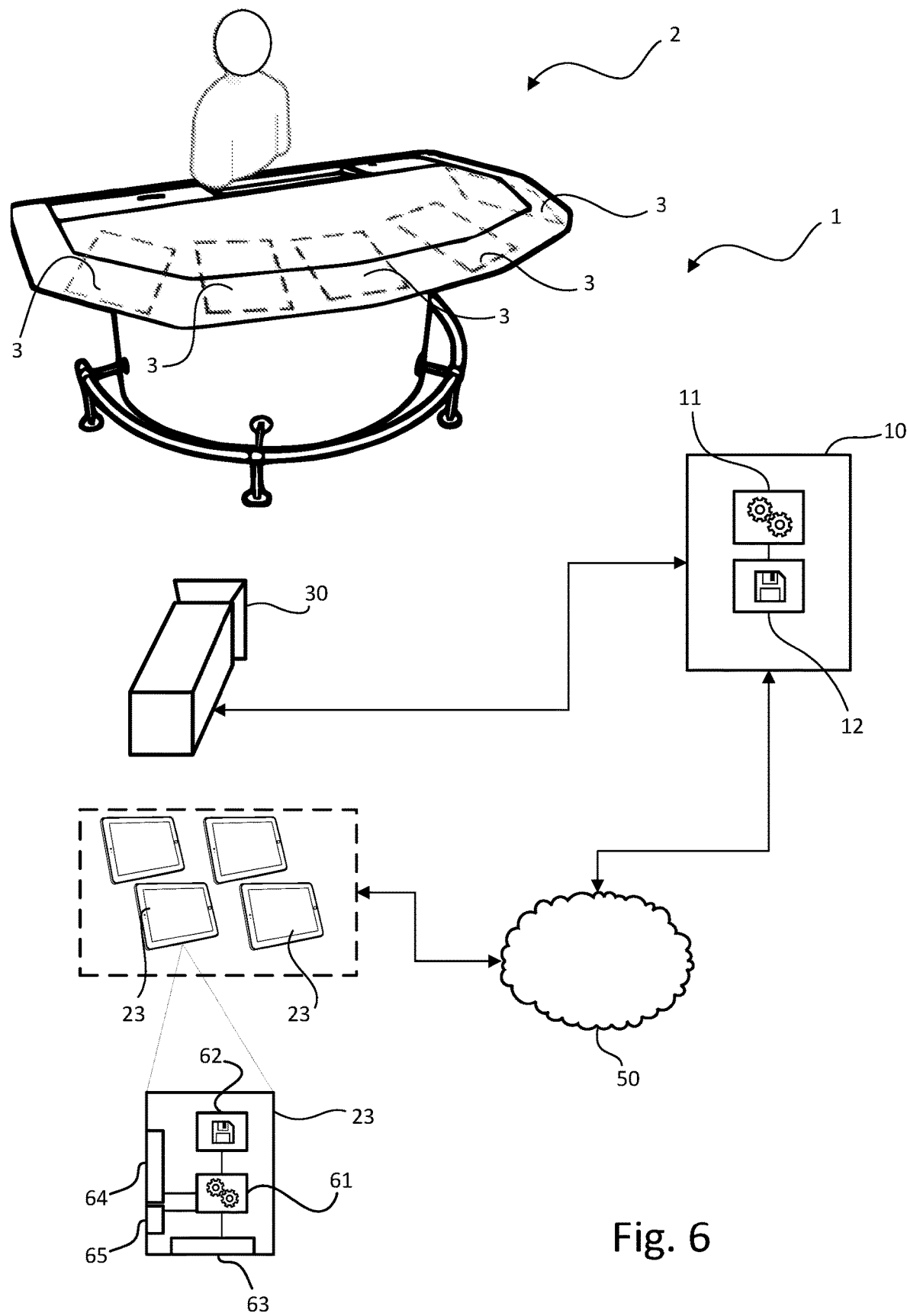
FIG. 6 is a schematic block diagram representation of a system and an electronic user device for controlling a graphical user interface in a live-casino environment in accordance with an embodiment of the present disclosure.

FIG. 6 is a schematic block diagram representation of a system 1 for controlling a graphical user interface in a live-casino environment in accordance with an embodiment of the present disclosure. In particular, the method is suitable for controlling a graphical user interface of an online live Blackjack game on a handheld electronic user device such as a smartphone, tablet, or the like. The system 1 has a physical table game surface 2 upon which a turn-based live casino game involving betting is played. The physical table game surface 2 has a plurality of player areas 3 distributed across the table game surface.

The system 1 further has a camera 30 configured to record a live video stream of the physical table game surface, and a server 10 configured to obtain the live video stream and provide the video stream to a plurality of remote electronic devices. The system further has one remote electronic device 23 comprising one or more processors 61 (may also be referred to as control circuitry), at least one memory 62, a communication interface 63, a display apparatus 64, and at least one user input device 65. The one or more processors of the remote electronic device 23 is configured to operate instructions stored in the memory for displaying the video stream and detecting user input events from the at least one user input device, and further configured to operate a method according to any one of the embodiments disclosed herein.

In more detail, the one or more processors 61 are configured to execute instructions stored in the memory 62 to perform a method for controlling a graphical user interface in a live-casino environment according to any one of the embodiments disclosed herein. Stated differently, the memory 62 of the remote electronic device 23 can include one or more (non-transitory) computer-readable storage mediums, for storing computer-executable instructions, which, when executed by one or more computer processors 61, for example, can cause the computer processors 61 to perform the techniques described herein. The memory 62 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The system may comprise a control device 10 having control circuitry 11 (i.e. one or more processors) and a memory 12. The control device is connected to the camera 30 and to a plurality of remote electronic devices 23 via an external network 50. The control circuit 11 is configured to execute instructions stored in the memory 12 to perform a method for controlling a graphical user interface in a live-casino environment according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. Furthermore, the control device 10 may further have a sensor interface and a communication interface (not shown) for communicating with peripheral entities or remote entities.

In summary, the herein disclosed embodiments provide for efficient interfaces for playing an online live Blackjack game. While user interfaces for playing online live Blackjack games exist, these interfaces may often be inefficient and associated with increased cognitive burden for the user. However, the techniques proposed herein can reduce the cognitive burden for a user who player online Blackjack games, and in particular for users playing fast-paced games, or several games simultaneously, thereby increasing productivity. Further, such techniques may reduce processor and battery power otherwise wasted on redundant user inputs caused by counter-intuitive and inefficient user interfaces.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a processing system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11, 61 may be or include any number of hardware components for conducting data or signal processing or for executing computer code stored in memory 12, 62. The devices have an associated memory 12, 62, and the memory 12, 62 may be one or more devices for storing data and/or computer code for completing or facilitating the various methods described in the present description. The memory may include volatile memory or non-volatile memory. The memory 12, 62 may include database components, object code components, script components, or any other type of information structure for supporting the various activities of the present description. According to an exemplary embodiment, any distributed or local memory device may be utilized with the systems and methods of this description. According to an exemplary embodiment the memory 12, 62 is communicably connected to the processor 11, 61 (e.g., via a circuit or any other wired, wireless, or network connection) and includes computer code for executing one or more processes described herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method, comprising:
at a plurality of remote electronic devices, each having a display apparatus and at least one user input device:
displaying, via the display apparatuses, a graphical user interface comprising:
a graphical representation comprising:
a live video stream of a physical table game surface upon which a turn-based live casino game involving betting is played, wherein the physical table game surface has a plurality of player areas distributed across the table game surface, wherein each remote electronic device is associated with at least one player area;
a plurality of graphical player elements for each player area, each plurality of graphical player elements being provided on a corresponding player area;
determining which of the plurality of player areas is associated with each remote electronic device;
for each launch of a game cycle of the live casino game, updating the graphical representation on each display apparatus by:
for each individual remote electronic device, digitally zooming in on one predefined area of a plurality of predefined areas of the physical table game surface based on the determined associated player area for the individual remote electronic device.

2. The method according to claim 1, further comprising:
obtaining a user decision event from the at least one user input device of one remote electronic device;
determining an occurrence of a time to act in the turn-based live casino game for each remaining remote electronic device during each game cycle;
after the obtained user decision event, updating the graphical representation on the display apparatus of the one remote electronic device by:
digitally zooming in on one predefined area of the plurality of predefined areas based on the determined time to act for each remote electronic device so to emphasize the player area associated with each remaining remote electronic device according to their time to act.

3. The method according to claim 2, further comprising:
while the graphical user interface is displayed, detecting a gesture, via the at least one input device, of the one remote electronic device, directed to the graphical user interface;
in response to detecting the gesture, at least temporarily stopping the digital zooming that is based on the predetermined time to act, and:
in accordance with a determination that the gesture is in a first direction, updating the graphical representation on the display apparatus of the one remote electronic device by digitally zooming in on a first predefined area of the plurality of predefined areas;
in accordance with a determination that the gesture is in a second direction, updating the graphical representation on the display apparatus of the one remote electronic device by digitally zooming in on a second predefined area different from the first predefined area.

4. The method according to claim 1, further comprising:
at a first remote electronic device of the plurality of remote electronic devices:
displaying, via the display apparatus of the first electronic device, the graphical user interface comprising the graphical representation further comprising:
a plurality of graphical interaction elements with which a user of the first electronic device can interact, the plurality of graphical interaction elements including a first graphical interaction element,
while displaying the graphical user interface, detecting, via the at least one user input device, an input directed to the first graphical interaction element:
in response to detecting the input:
updating the graphical user interface on the display apparatus of the first remote electronic device removing at least one graphical element from the player areas not associated with the first remote electronic device.

5. The method according to claim 1, further comprising:
obtaining the live video stream of the table game surface upon which the turn-based live casino game involving betting is played.

6. A computer-readable storage medium storing one or more programs configured to be executed by one or more processors of a processing system, the one or more programs comprising instructions for implementing operations comprising:
at a plurality of remote electronic devices, each having a display apparatus and at least one user input device:
displaying, via the display apparatuses, a graphical user interface comprising:
a graphical representation comprising:
a live video stream of a physical table game surface upon which a turn-based live casino game involving betting is played, wherein the physical table game surface has a plurality of player areas distributed across the table game surface, wherein each remote electronic device is associated with at least one player area;
a plurality of graphical player elements for each player area, each plurality of graphical player elements being provided on a corresponding player area;
determining which of the plurality of player areas is associated with each remote electronic device;
for each launch of a game cycle of the live casino game, updating the graphical representation on each display apparatus by:
for each individual remote electronic device, digitally zooming in on one predefined area of a plurality of predefined areas of the physical table game surface based on the determined associated player area for the individual remote electronic device.

7. The computer-readable storage medium according to claim 6, the operations further comprising:
obtaining a user decision event from the at least one user input device of one remote electronic device;
determining an occurrence of a time to act in the turn-based live casino game for each remaining remote electronic device during each game cycle;

after the obtained user decision event, updating the graphical representation on the display apparatus of the one remote electronic device by:
digitally zooming in on one predefined area of the plurality of predefined areas based on the determined time to act for each remote electronic device so to emphasize the player area associated with each remaining remote electronic device according to their time to act.

8. The computer-readable storage medium according to claim 7, the operations further comprising:
while the graphical user interface is displayed, detecting a gesture, via the at least one input device, of the one remote electronic device, directed to the graphical user interface;
in response to detecting the gesture, at least temporarily stopping the digital zooming that is based on the predetermined time to act, and:
in accordance with a determination that the gesture is in a first direction, updating the graphical representation on the display apparatus of the one remote electronic device by digitally zooming in on a first predefined area of the plurality of predefined areas;
in accordance with a determination that the gesture is in a second direction, updating the graphical representation on the display apparatus of the one remote electronic device by digitally zooming in on a second predefined area different from the first predefined area.

9. The computer-readable storage medium according to claim 6, the operations further comprising:
at a first remote electronic device of the plurality of remote electronic devices:
displaying, via the display apparatus of the first remote electronic device, the graphical user interface comprising the graphical representation further comprising:
a plurality of graphical interaction elements with which a user of the first remote electronic device can interact, the plurality of graphical interaction elements including a first graphical interaction element,
while displaying the graphical user interface, detecting, via the at least one user input device, an input directed to the first graphical interaction element:
in response to detecting the input:
updating the graphical user interface on the display apparatus of the first remote electronic device removing at least one graphical element from the player areas not associated with the first remote electronic device.

10. The computer-readable storage medium according to claim 6, the operations further comprising:
obtaining the live video stream of the physical table game surface upon which the turn-based live casino game involving betting is played.

11. A system comprising control circuitry configured to:
at a plurality of remote electronic devices, each having a display apparatus and at least one user input device:
display, via the display apparatuses, a graphical user interface comprising:
a graphical representation comprising:
a live video stream of a physical table game surface upon which a turn-based live casino game involving betting is played, wherein the physical table game surface has a plurality of player areas distributed across the table game surface, wherein each remote electronic device is associated with at least one player area;
a plurality of graphical player elements for each player area, each plurality of graphical player elements being provided on a corresponding player area;
determine which of the plurality of player areas is associated with each remote electronic device;
for each launch of a game cycle of the live casino game, update the graphical representation on each display apparatus by:
for each individual remote electronic device, digitally zooming in on one predefined area of a plurality of predefined areas of the physical table game surface based on the determined associated player area for the individual remote electronic device.

12. The system according to claim 11, wherein the control circuitry is further configured to:
obtaining a user decision event from the at least one user input device of a one remote electronic device;
determining an occurrence of a time to act in the turn-based live casino game for each remaining remote electronic device during each game cycle;
after the obtained user decision event, update the graphical representation on the display apparatus of the one remote electronic device by:
digitally zooming in on one predefined area of the plurality of predefined areas based on the determined time to act for each remote electronic device so to emphasize the player area associated with each remaining remote electronic device according to their time to act.

13. The system according to claim 12, wherein the control circuitry is further configured to:
while the graphical user interface is displayed, detect a gesture, via the at least one input device, of the one remote electronic device, directed to the graphical user interface;
in response to detecting the gesture, at least temporarily stop the digital zooming that is based on the predetermined time to act, and:
in accordance with a determination that the gesture is in a first direction, update the graphical representation on the display apparatus of the one remote electronic device by digitally zooming in on a first predefined area of the plurality of predefined areas;
in accordance with a determination that the gesture is in a second direction, update the graphical representation on the display apparatus of the one remote electronic device by digitally zooming in on a second predefined area different from the first predefined area.

14. The system according to claim 11, wherein the control circuitry is further configured to:
at a first remote electronic device of the plurality of remote electronic devices:
display, via the display apparatus of the first electronic device, the graphical user interface further comprising:
a plurality of graphical interaction elements with which a user of the first electronic device can interact, the plurality of graphical interaction elements including a first graphical interaction element, while displaying the graphical user interface, detect, via the at least one user input device, an input directed to the first graphical interaction element;
in response to detecting the input:
update the graphical user interface on the display apparatus of the first remote electronic device removing at least one graphical element from the player areas not associated with the first remote electronic device.

15. A system, comprising:
a physical table game surface upon which a turn-based live casino game involving betting is played, wherein the physical table game surface has a plurality of player areas distributed across the physical table game surface;
a camera configured to record a live video stream of the physical table game surface;
a server configured to obtain the live video stream and provide the live video stream to a plurality of remote electronic devices; and
one remote electronic device comprising one or more processors, at least one memory, a communication interface, a display apparatus, and at least one user input device;
wherein the one or more processors of the one remote electronic device are configured to:
display, via the display apparatus, a graphical user interface comprising:
a graphical representation comprising:
a live video stream of the physical table game surface upon which the turn-based live casino game involving betting is played, wherein the remote electronic device is associated with at least one player area;
a plurality of graphical player elements for each player area, each plurality of graphical player elements being provided on a corresponding player area;
determine which of the plurality of player areas is associated with the one remote electronic device;
for each launch of a game cycle of the live casino game, update the graphical representation on the display apparatus by:
for the one remote electronic device, digitally zooming in on one predefined area of a plurality of predefined areas of the physical table game surface based on the determined associated player area for the one remote electronic device.

16. The system of claim according to claim 15, wherein the one or more processors of the one remote electronic device are further configured to:
obtain a user decision event from the at least one user input device of the one remote electronic device; and
determine an occurrence of a time to act in the turn-based live casino game for the one remote electronic device during the game cycle.

17. The system according to claim 16, wherein the one or more processors of the one remote electronic device are further configured to:
display, via the display apparatus, the graphical user interface comprising the graphical representation further comprising:
a plurality of graphical interaction elements with which a user of the one remote electronic device can interact, the plurality of graphical interaction elements including a first graphical interaction element,
while displaying the graphical user interface, detect an input directed to the first graphical interaction element;
in response to detecting the input:
update the graphical user interface on the display apparatus of the one remote electronic device by removing at least one of the plurality of graphical interaction elements from the player areas not associated with the one remote electronic device.

18. An electronic device, comprising:
a display apparatus;
one or more processors;
at least one user input device;
memory storing one or more programs configured to be executed by the one or more processors, the one or more programs including instructions for:
displaying, via the display apparatus, a graphical user interface comprising:
a graphical representation comprising:
a live video stream of a physical table game surface upon which a turn-based live casino game involving betting is played, wherein the physical table game surface has a plurality of player areas distributed across the table game surface, wherein the electronic device is associated with at least one player area;
a plurality of graphical player elements for each player area, each plurality of graphical player elements being provided on a corresponding player area;
determining which of the plurality of player areas is associated with the electronic device; and
for each launch of a game cycle of the live casino game, updating the graphical representation on the display apparatus by:
for the electronic device, digitally zooming in on one predefined area of a plurality of predefined areas of the physical table game surface based on the determined associated player area for the electronic device.

19. The electronic device according to claim 18, the one or more programs further including instructions for:
obtaining a user decision event from the at least one user input device of the electronic device;
determining an occurrence of a time to act in the turn-based live casino game for the electronic device during each game cycle;
after obtaining the user decision event, updating the graphical representation on the display apparatus of the electronic device by:
digitally zooming in on one predefined area of the plurality of predefined areas based on the determined time to act to emphasize the one predefined area.

20. The electronic device according to claim 19, the one or more programs further including instructions for:
while the graphical user interface is displayed, detecting a gesture directed to the graphical user interface;
in response to detecting the gesture, at least temporarily stopping the digital zooming that is based on the determined time to act, and:
in accordance with a determination that the gesture is in a first direction, updating the graphical representation on the display apparatus of the electronic device by digitally zooming in on a first predefined area of the plurality of predefined areas;
in accordance with a determination that the gesture is in a second direction, updating the graphical representation on the display apparatus of the electronic device by digitally zooming in on a second predefined area of the plurality of predefined areas different from the first predefined area.

\* \* \* \* \*